Patented Aug. 14, 1951

2,564,104

UNITED STATES PATENT OFFICE 2,564,104

PROCESS FOR REACTING OLEFINIC COMPOUNDS WITH CARBON MONOXIDE AND HYDROGEN

William F. Gresham and Ambrose McAlevy, Wilmington, Del., assignors to E. I. du Pont de Nemours & Company, Wilmington, Del., a corporation of Delaware No Drawing. Application June 7, 1945, Serial No. 598,209

17 Claims. (Cl. 260—604)

This invention relates to the synthesis of aldehydes and other organic oxygen-containing compounds by reaction between organic unsaturated compounds containing olefinic unsaturation, carbon monoxide and hydrogen in the presence of specific catalysts, namely, salts of elements having an atomic number of from 27 to 29 inclusive.

It has been known heretofore that saturated aldehydes and ketones can be prepared by reaction between olefinic compounds, carbon monoxide and hydrogen in the presence of hydrogenation catalysts, such as certain metals and metal oxides which are known to have a hydrogenating action. These catalysts, according to the prior art, could be employed in solid form. Moreover, they could also be applied in the liquid phase, suspended, for example, in an inert liquid medium.

An object of this invention is to provide improved catalysts for preparing organic oxygen-containing compounds from compounds containing olefinic unsaturation, carbon monoxide, and hydrogen. A further object is to provide a process for preparing aldehydes from olefinic compounds, carbon monoxide, and hydrogen in the presence of catalysts which heretofore have not been considered to be hydrogenation catalysts.

It has been discovered in accordance with the present invention that soluble compounds, e. g. salts, of metals which exhibit hydrogenation catalyst properties, and especially salts of copper, cobalt and nickel which are soluble in water or organic media employed in the practice of the invention (which soluble compounds heretofore have not been useful as catalysts in ordinary hydrogenation reactions since they themselves are rapidly reduced to metals under hydrogenation conditions) are excellent catalysts for the synthesis of aldehydes by simultaneous reaction between carbon monoxide, hydrogen and compounds containing olefinic unsaturation. It has been discovered in accordance with the invention that soluble salts of such metals as cobalt, copper, and the like, under appropriate conditions hereinafter set forth, are completely stable towards hydrogen when employed in the synthesis of aldehydes from carbon monoxide, hydrogen, and compounds containing olefinic unsaturation. The solubility characteristics of these salts of copper and cobalt render them readily recoverable, and highly valuable as catalysts in continuous processes for the synthesis of aldehydes from olefines, carbon monoxide and hydrogen. In a preferred method of recovering the catalyst, the reaction product is distilled, and the remaining residue is recycled to the reaction vessel, with make-up reactants.

The soluble salts which may be employed in the practice of the invention are exemplified by such compounds as cobalt chloride, cobalt acetate, cobalt salts of long chain fatty acids, cobalt naphthenate, cobalt propionate, cobalt nitrilotriacetate, cobalt salts of acetylacetone, copper acetate, copper propionate, copper ethylene-bis-iminodiacetate, copper phenolate, copper chloride, nickel naphthenate and the like. If desired, these salts may be employed in aqueous solution or in a medium comprising an inert organic solvent. Salt-like compounds, such as compounds in which the copper, cobalt or nickel component is substituted for an imino or amido hydrogen, are operative in an equivalent manner. Combinations or complexes of the aforesaid salts with each other or with other salts such as promoters or buffers (potassium acetate, sodium propionate, etc.) are also effective. The amount of catalyst is generally within the range of about 0.05 to 10 per cent based on the total weight of the reaction mixture, but it has been observed that even smaller amounts exert an appreciable effect upon the reaction without being reduced to the metallic state. Preferably, the weight of catalyst is such that the metal component of the salt is present to the extent of about 0.1 to 3.0% by weight of the total reaction mixture.

The formation of aldehydes according to the invention may be represented, in specific embodiments, by the following overall equations:

(1) 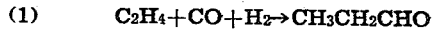  $C_2H_4 + CO + H_2 \rightarrow CH_3CH_2CHO$ (2) 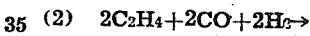  $2C_2H_4 + 2CO + 2H_2 \rightarrow$
 $C_2H_5CH=CCH_3CHO + H_2O$
(alpha-methyl-beta-ethylacrolein)

The reaction between the olefinic compound, carbon monoxide and hydrogen in the presence of the aforesaid soluble salts of cobalt, or nickel (elements having atomic numbers of 27–29, inclusive) is generally conducted at a temperature of about 125° to 350° C. preferably 150° to 250° C. according to the invention. The process may be carried out at ordinary or superatmospheric pressures, especially at pressures of from 50 atmospheres to 3000 atmospheres. At pressures in excess of 300 atmospheres, especially at about 550 atmospheres to 1500 atmospheres, the reaction product is predominantly aldehyde. The maximum pressure which may be employed is determined by the strength of the retaining vessel and may be as high as 3000 atmospheres or even higher.

While, under certain conditions, small amounts of copper or cobalt in finely divided form may be produced during the synthesis of aldehydes according to the invention, it is possible to substantially eliminate such precipitation of metal by operating with a sufficiently dilute catalyst. For best results the concentration of the catalyst should therefore be kept within the preferred range set forth above.

The relative proportions of reactants may be the stoichiometrically required quantities although other proportions may be employed if desired. Excellent results are obtained with the molar ratio of $CO:H_2:$olefine is within the range of about 1:2:1 to about 2:4:1 but such an excess of hydrogen is not at all indispensable.

In one method of practicing the invention, a compound, containing an aliphatic C=C linkage and a solution of the metal salt are placed in a pressure resistant vessel and a mixture of carbon monoxide and hydrogen is injected therein under high pressure. A polymerization inhibitor may also be present in the mixture if desired. Additional quantities of CO and $H_2$ may be injected from time to time to maintain the desired operating pressure. After the reaction is completed, the reaction product may be removed from the pressure resistant vessel and separated into its constituents by any convenient method such as fractional distillation. If the reaction medium contains water, the product generally contains two liquid phases. When this occurs, the main portion of the oxygen-containing product is generally recovered by distillation of the upper layer. If desired, the lower layer may be extracted with a suitable solvent such as ether to obtain additional quantities of the reaction products.

The unsaturated compounds which may be employed according to the invention include the olefines themselves (monoolefines, diolefines, aryl substituted olefines) as well as other substituted olefines such as the ethers, esters, carboxylic acids, ketones, aldehydes, anhydrides, halides, alcohols, etc. containing olefinic unsaturation.

Any inert liquid may be employed as a reaction medium, although if the catalyst is soluble in the reaction mixture in the absence of an added medium, no such medium need be employed. The choice of inert reaction medium is determined primarily by the solubility of a catalyst therein for it is desirable that the catalyst be homogeneously distributed throughout the inert medium. Thus water is a suitable medium when the catalyst is a water-soluble salt such as cobalt chloride, cupric acetate, cobalt acetate, or the like. When a catalyst which is soluble in organic solvents (such a cobalt naphthenate, copper stearate, etc.) is employed, suitable solvents are the saturated hydrocarbons such as n-hexane, cyclohexane, methyl cyclohexane and the like, aromatic hydrocarbons such as tetralin, benzene and alkyl benzenes, or saturated oxygen-containing compounds such as the aliphatic ethers or esters. When these reaction media are employed, products having the characteristics of unsaturated aldehydes are frequently obtained. The formation of unsaturated aldehydes is very unexpected for such products have never before been prepared by reaction between olefinic compounds, carbon monoxide and hydrogen.

The invention is illustrated further by means of the following examples.

*Example 1.*—A mixture containing 10 grams of cobalt chloride ($CoCl_2 \cdot 6H_2O$) and 100 cc. distilled water (corresponding to about 2.3 grams of chemically combined Co per 100 grams of aqueous solution), and 28 grams of ethylene was heated with a gas containing 2 volumes of hydrogen per volume of carbon monoxide (hereinafter called $CO:2H_2$) at a temperature of 166° to 185° C. under a pressure of 590 to 840 atmospheres for 2.0 hours. The resulting product containing 2 layers was discharged from the reaction vessel and was extracted with diethyl ether. The resulting extract was dried, after which it was filtered and distilled yielding 17.4 grams of an aldehydic product having a boiling point up to 87°/6 mm. The chief constituent of this fraction was alpha-methyl-beta-ethyl-acrolein, $C_2H_5CH=CCH_3CHO$, boiling point of 76°/102 mm. to 83°/102 mm. The aqueous layer upon evaporation, gave 9.2 grams of recovered cobalt chloride.

*Example 2.*—A mixture containing 10 grams of cupric acetate ($Cu(OAc)_2 \cdot H_2O$), 100 cc. of water and 28 grams of ethylene was heated with $CO:2H_2$ at 200° to 210° C. under a pressure of 610 to 750 atmospheres for 2 hours. The resulting product containing two layers was withdrawn from the reaction vessel and distilled, yielding a steam distillate comprising 8.2 grams of mixed saturated and unsaturated aldehydes as the upper layer.

*Example 3.*—A mixture containing 5.42 grams of potassium acetate, 4.58 grams of cobalt acetate ($Co(OAc)_2 \cdot 4H_2O$), 100 cc. of distilled water and 28 grams of ethylene was heated with $CO:2H_2$ in a silver-lined shaker tube for 85 minutes at 175° to 182° C. under a pressure of 600 to 700 atmospheres. Distillation of the resulting product gave 2.5 grams of propionaldehyde, B. P. 48° C., and 10.8 grams of $$C_2H_5CH=CCH_3CHO$$

which steam-distilled at 83° to 100° C.

*Example 4.*—A mixture containing 10 grams cobalt naphthenate, 102 cc. benzene and 42.1 grams of propylene was heated in a silver-lined shaker tube with $CO:3H_2$ for one hour at 145° to 170° C. under a pressure of 600 to 740 atmospheres. Distillation of resulting product gave a mixture of butyraldehydes, which were difficultly separable from benzene, and also about 16 grams of higher boiling product, from which a constant-boiling fraction (weight 8 grams; B. P. 49° to 50° C. at 6 mm.) was obtained. This fraction had a free carbonyl number of 306.7 (carbonyl number is the milligrams of KOH required to neutralize the acid liberated by reacting 1.0 gram of the sample with hydroxyl-amine hydrochloride).

*Example 5.*—A mixture containing 10 grams of cobalt acetate ($Co(OAc)_2 \cdot 4H_2O$), 100 cc. of water and 28 grams of ethylene was heated in a pressure resistant vessel for two hours with $CO:2H_2$ at a temperature of 170° to 190°. The resulting product was extracted with ether, and the ether extract was dried and distilled, yielding 10.5 grams of $C_2H_5CH=CCH_3CHO$ having a boiling point of 46° to 59° at 49 mm. This aldehyde had a carbonyl number of 445 and reacted with 2,4-dinitrophenylhydrazine hydrochloride to give a brick-red 2,4 dinitrophenyl hydrazone having a melting point of 161.1° C.

While in the foregoing examples the invention is illustrated as a method for preparing saturated and unsaturated aldehydes, it is to be understood that the method can be adapted to the manufacture of other organic compounds derivable therefrom such as esters, ethers, acetals and the like.

The invention may be carried out batchwise or continuously. Any suitable pressure resistant vessel such as an autoclave or a tubular convertor, preferably made of or lined with inert materials such as glass, porcelain, inert metals and the like, may be employed. In the continuous process, the reactants may be introduced in one or more points in the reaction vessel if desired.

Since many embodiments of the invention may be made without departing from the spirit and scope thereof, it will be understood that we do not limit ourselves except as set forth in the following claims.

We claim:

1. A process for preparing oxygen-containing compounds which comprises reacting an unsaturated compound containing olefinic unsaturation simultaneously with carbon monoxide and hydrogen in the presence of an inert reaction medium having dissolved therein a catalyst consisting of a salt of an element having an atomic number of from 27 to 29 inclusive.

2. A process for preparing oxygen-containing compounds which comprises reacting an unsaturated compound containing olefinic unsaturation simultaneously with carbon monoxide and hydrogen, in the presence of an inert medium having dissolved therein a catalyst consisting of a soluble salt of an element having an atomic number from 27 to 29 inclusive, at a temperature within the range of about 125° to 350° C.

3. A process for preparing oxygen-containing compounds which comprises reacting an unsaturated compound containing olefinic unsaturation simultaneously with carbon monoxide and hydrogen, in the presence of an inert medium having dissolved therein a catalyst consisting of a soluble salt of an element having an atomic number from 27 to 29 inclusive, at a temperature within the range of about 150° to 250° C. under superatmospheric pressures.

4. A process for preparing oxygen-containing compounds which comprises reacting an unsaturated compound containing olefinic unsaturation simultaneously with carbon monoxide and hydrogen, in the presence of an inert medium having dissolved therein a catalyst consisting of a soluble salt of an element having an atomic number from 27 to 29 inclusive, at a temperature within the range of 150° to 250° C. under a pressure of from 550 to 1500 atmospheres, thereafter distilling at least a part of the volatile constituents of the resultant reaction product, and recycling the remaining residue with additional unsaturated compound, carbon monoxide and hydrogen under the aforesaid reaction conditions.

5. A process for preparing oxygen-containing compounds which comprises reacting an unsaturated compound containing olefinic unsaturation simultaneously with carbon monoxide and hydrogen in an inert organic medium containing a dissolved catalyst consisting of a soluble salt of an element having an atomic number from 27 to 29 inclusive, at a temperature within the range of 150° to 250° C. under a pressure of from 550 to 1500 atmospheres pressure.

6. A process for preparing oxygen-containing compounds which comprises reacting an unsaturated compound containing olefinic unsaturation simultaneously with carbon monoxide and hydrogen in the presence of an aqueous solution of a catalyst consisting of a soluble salt of an element having an atomic number from 27 to 29 inclusive, at a temperature within the range of 150° to 250° C. under a pressure of from 550 to 1500 atmospheres pressure.

7. A process for preparing oxygen-containing compounds which comprises reacting an unsaturated compound containing olefinic unsaturation simultaneously with carbon monoxide and hydrogen at a temperature within the range of 150° to 250° C. under a pressure of from 550 to 1500 atmospheres pressure in the presence of an aqueous solution of a catalyst comprising a water-soluble salt of an element having an atomic number of from 27 to 29 inclusive, the quantity of the said salt being sufficient to provide from 0.1 to 3.0% of the metal combined therein, based on the total weight of the reaction mixture.

8. A process for preparing oxygen-containing compounds which comprises reacting a monoolefine simultaneously with carbon monoxide and hydrogen at a temperature within the range of 150° to 250° C. under a pressure of from 550 to 1500 atmospheres pressure in the presence of an aqueous solution of a catalyst comprising a water-soluble salt of an element having an atomic number of from 27 to 29 inclusive, the quantity of the said salt being sufficient to provide from 0.1 to 3.0% of the metal combined therein, based on the total weight of the reaction mixture.

9. A process for preparing oxygen-containing compounds which comprises reacting ethylene simultaneously with carbon monoxide and hydrogen at a temperature within the range of 150° to 250° C. under a pressure of from 550 to 1500 atmospheres pressure in the presence of an aqueous solution of a catalyst comprising a water-soluble salt of an element having an atomic number of from 27 to 29 inclusive, the quantity of the said salt being sufficient to provide from 0.1 to 3.0% of the metal combined therein, based on the total weight of the reaction mixture.

10. A process for preparing aldehydes which comprises reacting ethylene simultaneously with carbon monoxide and hydrogen at a temperature within the range of 150° to 350° C. under a pressure of from 550 to 1500 atmospheres pressure in the presence of an aqueous solution of a catalyst comprising a water-soluble salt of an element having an atomic number of from 27 to 29 inclusive, the quantity of the said salt being sufficient to provide from 0.1 to 3.0% of the metal combined therein, based on the total weight of the reaction mixture, and thereafter separating alpha-methyl-beta-ethyl-acrolein from the resultant product.

11. A process for preparing aldehydes which comprises reacting propylene simuutaneously with carbon monoxide and hydrogen at a temperature within the range of 150° to 250° C. under a pressure of from 550 to 1500 atmospheres pressure in the presence of an aqueous solution of a catalyst comprising a water-soluble salt of an element having an atomic number of from 27 to 29 inclusive, the quantity of the said salt being sufficient to provide from 0.1 to 3.0% of the metal combined therein, based on the total weight of the reaction mixture, whereby an aldehydic product is obtained.

12. A process for preparing aldehydes which comprises reacting a monoolefine simultaneously with carbon monoxide and hydrogen in the presence of a salt of an element having an atomic number of from 27 to 29 at a temperature within the range of 150° to 250° C. under a pressure above about 300 atmospheres, said salt being dissolved in the reaction mixture.

13. A process for preparing oxygen-containing compounds which comprises reacting an unsaturated compound containing olefinic unsaturation simultaneously with carbon monoxide and hydrogen in the presence of an aqueous solution of cobalt chloride at a temperature within the range of 150° to 250° C. under a pressure of from 550 to 1500 atmospheres pressure.

14. A process for preparing oxygen-containing compounds which comprises reacting an unsaturated compound containing olefinic unsaturation simultaneously with carbon monoxide and hydrogen in the presence of an aqueous solution of cupric acetate at a temperature within the range of 150° to 250° C. under a pressure of from 550 to 1500 atmospheres.

15. A process for producing propionaldehyde and alpha-methyl-beta-ethylacrolein simultaneously which consists essentially in reacting ethylene with carbon monoxide and hydrogen in the presence of an aqueous solution of cobalt chloride containing about 2.3 grams of chemically combined cobalt per 100 grams of the said aqueous solution at a temperature of about 166° to 185° C. under a pressure of about 590 to 840 atmospheres, whereby a product containing propionaldehyde and alpha-methyl-beta-ethylacrolein is formed.

16. A process for preparing organic oxygen-containing compounds which comprises reacting an unsaturated compound containing olefinic unsaturation simultaneously with carbon monoxide and hydrogen under superatmospheric pressure at a temperature within the range of 125° to 350° C. in the presence of a salt of an element having an atomic number from 27 t said salt being dissolved in the reaction mixt 17. A process for preparing organic oxy containing compounds which comprises reac an unsaturated compound containing olefinic saturation simultaneously with carbon mono and hydrogen in the presence of a compoun an element having an atomic number from to 29 as catalyst, the catalyst being entirely solved in the reaction mixture.

WILLIAM F. GRESHAM.
AMBROSE McALEVY.

REFERENCES CITED

The following references are of record in the file of this patent:

UNITED STATES PATENTS

| Number | Name | Date |
|---|---|---|
| 1,973,662 | Schalch | Sept. 11, 1934 |
| 2,211,022 | Michael | Aug. 13, 1940 |
| 2,259,895 | Koenig | Oct. 21, 1941 |
| 2,327,066 | Roelen | Aug. 17, 1943 |
| 2,361,997 | Dreyfus | Nov. 7, 1944 |
| 2,402,133 | Gresham et al. | June 18, 1946 |

FOREIGN PATENTS

| Number | Country | Date |
|---|---|---|
| 113,828 | Australia | Sept. 20, 1939 |

OTHER REFERENCES

"Report on the Petroleum and Synthetic Oil Industry of Germany," B. I. O. S. Overall Report No. 1, London, His Majesty's Stationery Office, 13947, page 101.